US008793452B1

(12) United States Patent
McCloskey et al.

(10) Patent No.: US 8,793,452 B1
(45) Date of Patent: Jul. 29, 2014

(54) METHOD OF GUARANTEEING REPLICATION OF DATA WRITTEN BY A MAINFRAME TO A VIRTUAL TAPE

(75) Inventors: Larry W. McCloskey, Burlington, MA (US); Karyn M. Kelley, Peabody, MA (US); Douglas R. Phillips, Webster, MA (US)

(73) Assignee: EMC Corporation, Hopkinton, MA (US)

( * ) Notice: Subject to any disclaimer, the term of this patent is extended or adjusted under 35 U.S.C. 154(b) by 218 days.

(21) Appl. No.: 13/435,555

(22) Filed: Mar. 30, 2012

(51) Int. Cl.
*G06F 12/00* (2006.01)
*G06F 13/00* (2006.01)
*G06F 13/28* (2006.01)

(52) U.S. Cl.
USPC ........................................................ 711/162

(58) Field of Classification Search
CPC . G06F 3/065; G06F 3/0659; G06F 17/30227; G06F 17/30578
USPC ........................................................ 711/162
See application file for complete search history.

(56) References Cited

U.S. PATENT DOCUMENTS

| 7,523,148 | B2* | 4/2009 | Suzuki et al. ................. 1/1 |
| 8,291,183 | B2 | 10/2012 | McCloskey et al. | |
| 2008/0162813 | A1* | 7/2008 | Haustein et al. .............. 711/115 |
| 2011/0196836 | A1* | 8/2011 | Kesselman ................... 707/634 |

OTHER PUBLICATIONS

Bus-Tech, Inc., "EMC$^2$: Virtuent Software Engine [online]," [retrieved on Mar. 8, 2010], pp. 1-2. Retrieved from the Internet URL: http://www.bustech.com/products/virtuent.asp.
EMC Corporation, "EMC Disk Library for Mainframe: Integrated Solution for All Tape Use Cases," pp. 1-3. Copyright 2010, 2012, published in the USA, Jan. 2012 *Data Sheet H4207.7*.
EMC$^2$, "White Paper: Using EMC Celerra IP Storage With Microsoft Hyper-V Over iSCSI: Best Practices Planning," pp. 1-31, Jan. 2009.
EMC$^2$, "Introduction to Using EMC® Celerra® with VMware vSphere 4: Applied Best Practices Guide," pp. 1-55, May 2009.

* cited by examiner

*Primary Examiner* — Matthew Bradley
*Assistant Examiner* — Rocio Del Mar Perez-Velez
(74) *Attorney, Agent, or Firm* — Hamilton, Brooks, Smith & Reynolds, P.C.

(57) ABSTRACT

Replication requests are initiated in a virtual tape emulation system by storing a replication request in a persistent storage area that is shared between a virtual tape emulator and a control station. When the control station sees a pending replication request it initiates a request to a replication control to replicate the affected file or file system to a backup storage array. The control station deletes the replication request when the replication task completes. Deletion of the replication requests from the shared area is taken by the virtual tape task as a signal that replication has successfully completed, and can be reported to the mainframe.

17 Claims, 2 Drawing Sheets

METHOD OF GUARANTEEING REPLICATION OF DATA WRITTEN BY A MAINFRAME TO A VIRTUAL TAPE

BACKGROUND

Large-scale mainframe computers continue to be used extensively across many industries. Historically, tape storage has been used to provide permanent and temporary to data protection services to those mainframes. In such environments, it is not uncommon for mainframe tape libraries to hold hundreds of terabytes (TB) of data spread across tens of thousands of tape volumes.

Virtual tape emulation (VTE) products such as DLm available from EMC is Corporation of Hopkinton, Mass. can be used to emulate a given number of tape volumes to the mainframe using disk drives as the storage media instead of magnetic tape. As a mainframe-based application writes data to what it believes is a tape drive, that data is actually stored as a tape volume image on direct access storage device such as a disk array subsystem system. Each individual tape volume written by the mainframe becomes a single disk file on the file system on the disk array.

Such VTE products ultimately allow the operators of mainframe data centers to move from a tape-based backup solution to a disk-based backup solution, leveraging today's high speed low cost disk technology to provide an innovative approach to data storage.

Guaranteed replication is an important feature of most modern disk-based file storage systems. Replication is a process that occurs typically in the background from the perspective of an application program, whereby mass storage devices such as disk arrays are backed up to a secondary storage media that may be local to or remote from this primary media.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF EXAMPLE EMBODIMENTS

A description of example embodiments follows.

Certain complications arise when attempting to add replication features to a prior art virtual tape emulation environment. Direct communication between virtual tape tasks and other disk array functions such as replication require holding open a communication channel between the virtual tape tasks and the system control station. This can result in significant usage of processor and memory resources, especially on the system control station, resulting in significant delay in executing replication processes which typically have lower priority than main application processes. This can ultimately lead to the failure of replication processes, which in turn result in failure notification to the mainframe—even though the replication process itself would have successfully completed if it were not for the overhead imposed by the control station.

In preferred embodiments herein, direct communication between a virtual tape emulator (VTE), a control station, and a storage array is eliminated. Instead, replication requests are initiated by having the VTE write a replication request file. The replication request file is stored in a disk, memory, or other persistent storage area that is shared between the virtual tape emulator and the control station. A task on the control station monitors the shared storage area. When it sees that one or more replication requests have been written by a VTE, it gathers all such outstanding requests for a given file system (or other unit of replication). The control station may then initiate one replication request for that file system. When the replication task completes, the control station can delete the replication request files which initiated the replication. In the meantime, the VTE also monitors the shared storage area for its respective request files, looking for when they are deleted by the control station. Deletion of the replication requests from the shared area is taken as a signal that replication has successfully completed.

In addition there can be a timeout mechanism in place such that if a virtual tape operation does not complete a certain time, the virtual tape task can inform the mainframe host that replication failed. This can be for example by sending a unit check response.

In preferred embodiments there may be more than one active virtual tape task running in more than one VTE at a time. Therefore, there may often be many pending replication requests in the shared storage area. This can also occur as a result of multiple tapes being written by a given host at a particular time, or may also occur as a result of multiple tape tasks executing at a given time.

Figure 1:
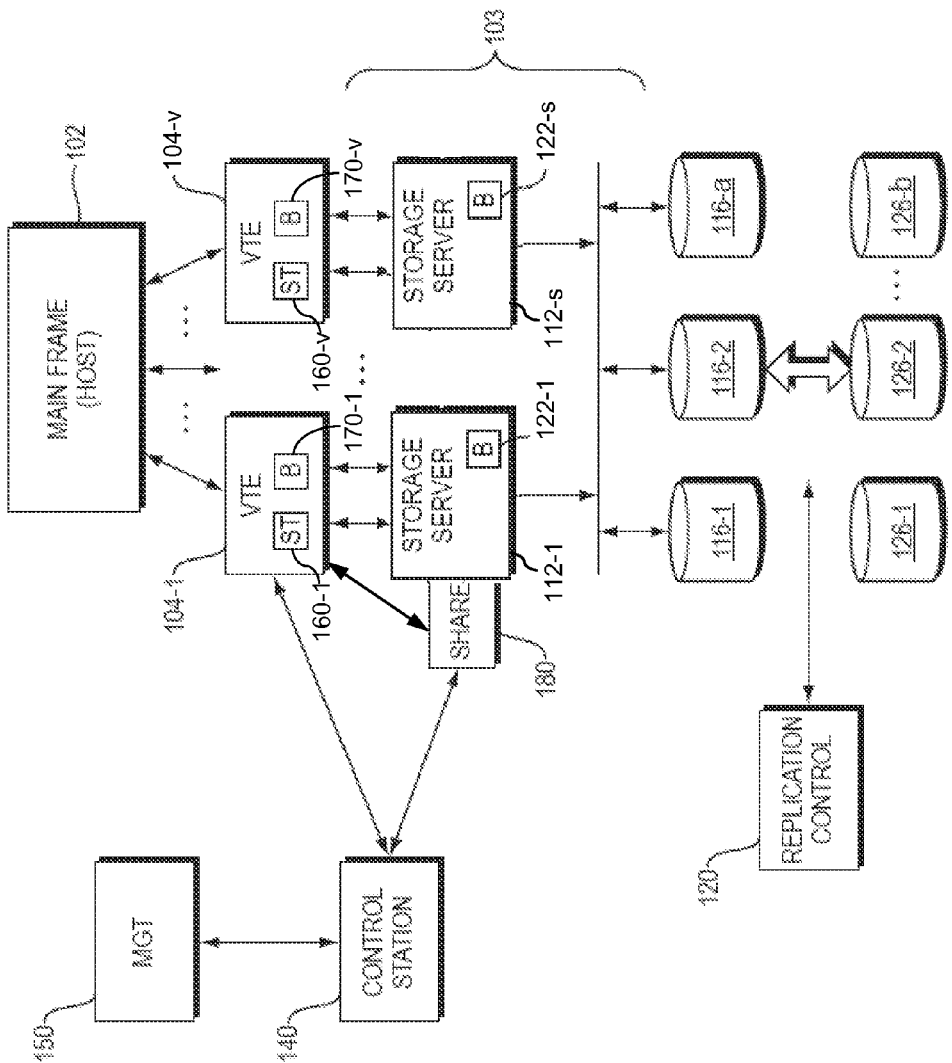
FIG. 1 is a high-level block diagram of a tape emulation system.

More particularly, FIG. 1 is a high-level block diagram showing a data processing environment in which replication can be implemented in a virtual tape is emulator according to the teachings herein. The environment includes a host, also called a mainframe 102 herein, and one or more virtual tape emulation (VTE) subsystems 104-1, . . . , 104-v such as based on the Disk Library for Mainframe (DLm) product available from EMC Corporation of Hopkinton Mass. The virtual tape emulation subsystem(s) 104 connect to the mainframe 102 via high-speed FICON, ESCON, or other connection(s).

A backend storage subsystem 103 accessible to the VTEs 104 stores the data as one of a plurality of virtual tape volume images. Each individual tape volume image written by the mainframe 102, can, for example, be a single disk file or a complete file system. The storage subsystem 103 may therefore consist of an internal local area network and one or more storage servers 112-1, . . . , 112-s that manage backend disk array(s) 116-1, . . . , 116-a. It should be understood that the backend disk arrays 116 may implement a hierarchy of storage protocols such as Redundant Array of Independent Disks (RAID), storage array network (SAN), data de-duplication, replication, garbage collection, and/or other storage management functions that may not be visible to or under the control of the storage servers 112, and are certainly not visible or under the control of the VTE 104 or the mainframe 102.

The storage servers 112 may typically include one or more internal buffers 122 in which they store data temporarily as it is managed and passed back and forth between the storage arrays 116 and the VTE 104.

Despite using direct access storage devices such as disk drive arrays 116-1, . . . , 116-a as the mass media, the VTE 104 makes them appear to the mainframe 102 as a physical tape drive. From the perspective of the mainframe, the VTE 104 therefore executes typical tape-like commands and responds to such commands in the same way that a physical tape drive would respond. This means that existing work processes based on tape management systems and applications can run on the mainframe 102 without is any modifications. The VTE 104-1 can thus be said to emulate a given number of virtual tape volumes to the mainframe 102.

As will be understood shortly, the VTEs 104 carry out certain ones of these virtual tape tasks in a specific way using an included local buffer (B) 170 as well as a sync table (ST) 160 and a persistent storage area 180 shared with the storage servers 112.

Also shown in FIG. 1 is a replication control 120 and a secondary storage array 126-1, 126-2, . . . , 126-B. Replication control 120 is responsible for backing up the backend storage array to the secondary storage array(s) 126 to provide for example, disaster recovery. Replication control 120 executes independently of the virtual tape tasks running in the VTEs 104 and is typically further orchestrated through a control station 140, which in turn receives information such as configuration and other commands from an operator via a management interface 150. It should also be understood that the replication subsystem including replication control 120 and secondary arrays 126 may be physically local to the backend storage subsystem 103 and connected via a Local Area Network (LAN), or more commonly may be remote and connected over a Wide Area Network (WAN).

Figure 2:
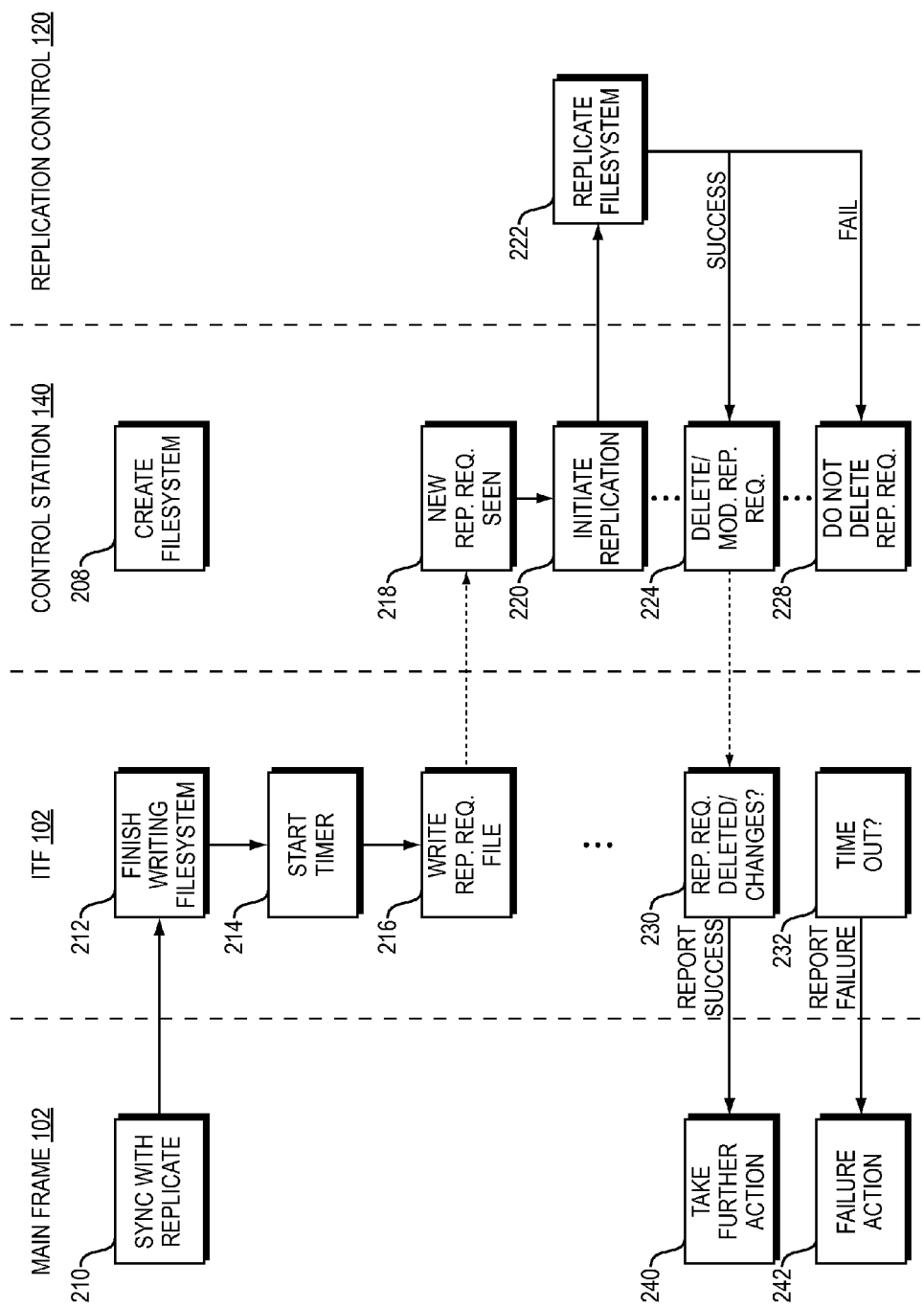
FIG. 2 is a flow diagram of guaranteed replication process.

FIG. 2 illustrates a process and information flow diagram for interactions between the mainframe 102, a virtual tape emulator (VTE) 104, control station 140 and replication control 120 to implement guaranteed replication in a virtual tape environment.

In a first state 210 the mainframe issues a certain type of tape command to the VTE 104. This may take the form of a "sync with replicate" command from the mainframe, indicating that a particular open file or entire file system should be closed and replicated. It can take the physical form of the virtual tape emulator receiving a command to write two consecutive tape marks, or other indication that a tape based file system is to be closed. However it should be understood that this state 210 may be reached in other ways, such as when the mainframe is requesting a replication refresh operation.

In state 212 the VTE then takes any necessary steps to complete outstanding operations necessary to close the file such as flushing any remaining data to the backend storage array.

Next, in state 214, the VTE 104 starts a replication refresh timer.

Next, replication of the file system is requested of the control station 140. However, this is not done by sending a message over a communication channel, but rather by writing replication refresh request data to a common persistent storage area 180. This common persistent storage area 180 may be physical part of the VTEs 104, or part of the storage array subsystem 103 such as shared memory locations of one or more of the storage servers 112, or on a location on the disks 116. What is important is that the persistent storage area is in a location that is accessible to both the virtual tape emulator 104 and the control station 140.

Next in state 230, periodically such as once every second, the VTE 104 checks for the continued existence of the replication refresh request information. When it detects that the corresponding replication request information has been deleted (or changed), this is taken as a signal that the replication task successfully completed. The VTE can then report a successful completion indication to the mainframe 210, which can then proceed with further successful action in state 240.

If on the other hand, the replication request file is not deleted (or changed) by the control station before the preselected timeout period, state 232 is reached where a replication failure is sent to the mainframe 102, with the mainframe then taking failure action in state 242.

When the replication refresh processing is unsuccessful, the virtual tape file has not yet been closed or repositioned in any way by the VTE 104. The mainframe 102 is thus still in control of the next operation to be taken with the virtual tape, and can continue to perform any appropriate operations the mainframe 102 chooses.

In the meantime, a guaranteed replication process also runs on the control station 140. In an initial state 218 this monitors the shared storage area 180 for any new replication requests. In one embodiment, as more fully detailed below, the shared storage area can be part of a shared disk, and the replication request can take the form of a file stored in a directory on the disk.

Upon detecting that a new unique replication request file exists in the directory, the control station 140 then initiates a replication refresh command in state 220 for the file system identified in the replication request. This causes the replication control 120 to enter state 222 and attempt to replicate the requested file system. Other pending replication requests associated with the same file system may also be initiated together.

Eventually a state 224 may be entered in which the replication process reports a successful completion. If the replication control 120 process terminates with such a successful indication, all affected replication request files that existed are then deleted from the shared area 180.

However if the replication process 222 terminates with an unsuccessful result, a state 228 is reached where the associated replication request files are not deleted. In this event, upon a next iteration by the control station 140 of examining the shared area for replication request files, the control station 140 will again detect that the same replication request file still exists, and start another replication refresh request for the is same file system in state 220 again.

The control station may have a predetermined period of time, such as every five seconds, at which it iterates and checks for the existence of any new replication request files, to insure that execution the corresponding steps in FIG. 2 for control station 140 is continuous. This process thus continues indefinitely, until the replication refresh 222 is successful, and state 224 in the control station 140 and thence state 230 in the VTE is reached, or after a timeout occurs and VTE reaches state 232.

The process of FIG. 2 handles only one replication request command for any given replication request at a time, but it will satisfy all the replication refresh request files that exist at the start of that refresh. In the meantime, any files with replication requests that already have a refresh in progress will be ignored during this pass. Those requests will be picked up on the next pass after the current refresh on that replication request completes.

The replication request in one embodiment can take the form of an empty disk file, with all of the information needed by the control station 140 being conveyed in the filename. The filename is composed of six variable-length elements, each separated by a space:

"GR nodename devname volser fsname replicationId"

The constant "GR" identifies this file as a replication-refresh request file.

nodename identifies the VTE node making the request. This field is not currently used by the control station script.

devname identifies the device writing the file to be replicated. This field is not currently used by the control station script.

volser identifies the tape that is to be replicated. This field is not currently used by the control station script.

fsname identifies the Celerra file system on which the file to be replicated resides. This field is not currently used by the control station script.

replicationID is the value needed for the id parameter passed to the nas replicate refresh command that will be executed by the control station.

Here is an example of a replication-refresh request filename:

GR VTE1 B800 ST1080 tapelib_ST113_APM00084101407_0000_129_APM00084101407_0000

If any error occurs during the writing of the replication-refresh request file, a message can be displayed on the management console via the control station, or other indication of a Guaranteed Replication failure is signaled to the host, such as by returning a unit check error with equipment check sense to the mainframe.

A person of ordinary skill in the art will appreciate that embodiments or aspects of the method and system described above may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   emulating operations of a virtual tape system to a mainframe processor;
   forwarding data received from the mainframe processor for storage by a backend storage subsystem;
   receiving an instruction from the mainframe processor requesting an operation within the virtual tape system, wherein the operation requires replication request information;
   writing replication request information to a persistent storage area shared with a control station; and
   monitoring the persistent storage area to determine when the replication request information is modified.

2. The method of claim 1 further comprising:
   detecting when the replication request information is modified; and
   indicating successful completion of the replication request to the mainframe processor.

3. The method of claim 1 further comprising:
   upon expiration of a predetermined time after writing replication request information, indicating unsuccessful completion of the replication request to the mainframe processor.

4. The method of claim 1 wherein the shared persistent area is a disk directory and the replication request information is an empty disk file.

5. The method of claim 1 wherein the control station further monitors the persistent storage area for new replication request information; and
   initiating replication request to a replication process.

6. The method of claim 5 wherein the replication process executes in a separate storage replication subsystem to a secondary storage array.

7. The method of claim 5 wherein the control station deletes the replication request information only upon indication of success from the replication process.

8. The method of claim 1 further comprising:
   flushing data previously received from the mainframe to the backend storage subsystem prior to having received the instruction from the mainframe requesting replication.

9. An apparatus comprising:
   a virtual tape emulator, connected to a mainframe processor to receive tape commands, and connected to forward data received from the mainframe, the tape commands including operations of a virtual tape system that require replication;
   a backend storage subsystem, for storing data received from the virtual tape emulator;
   a replication subsystem, for replicating data stored in the back end storage subsystem;
   a control station, for controlling the back end storage subsystem and the replication subsystem; and
   a persistent data storage device shared between the virtual tape emulator and the control station, for storing replication request information.

10. The apparatus of claim 9 wherein the virtual tape emulator further detects when the replication request information is modified; and
    indicates successful completion of the replication request to the mainframe processor.

11. The apparatus of claim 9 wherein the virtual tape emulator further upon expiration of a predetermined time after writing replication request information, indicates unsuccessful completion of the replication request to the mainframe processor.

12. The apparatus of claim 9 wherein the shared persistent area is a disk directory and the replication request information is an empty disk file.

13. The apparatus of claim 9 wherein the control station further reads information from the persistent storage area to determine new replication request information; and
    initiates a replication request to the replication subsystem.

14. The apparatus of claim 13 wherein the replication subsystem further comprises a remotely located secondary storage array.

15. The apparatus of claim 13 wherein the control station further deletes the replication request information upon indication of success from the replication process.

16. The apparatus of claim 9 wherein the virtual tape emulator further:
    flushes data previously received from the mainframe to the backend storage subsystem.

17. A programmable computer system product for emulating operations of a tape drive to a mainframe processor, the programmable computer system product comprising one or more data processing machines that execute instructions retrieved from a storage media, the instructions for:
    forwarding data received from the mainframe processor for storage by a backend storage subsystem;

receiving an instruction from the mainframe processor requesting an operation within the virtual tape system, wherein the operation requires replication request information;

writing replication request information to a persistent storage area shared with a control station; and monitoring the persistent storage area to determine when the replication request information is modified.

\* \* \* \* \*